US006643366B2

United States Patent
Phan et al.

(10) Patent No.: US 6,643,366 B2
(45) Date of Patent: Nov. 4, 2003

(54) CONTROL OF ACCESS TO THE CALL COMPLETION ON BUSY LINK SERVICE IN A PRIVATE TELECOMMUNICATION NETWORK

(75) Inventors: Cao Thanh Phan, Rueil Malmaison (FR); Daphné Bienvenu, Franconville (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/362,115

(22) Filed: Jul. 28, 1999

(65) Prior Publication Data

US 2003/0012357 A1 Jan. 16, 2003

(30) Foreign Application Priority Data

Aug. 6, 1998 (FR) .............................. 98 10130

(51) Int. Cl.[7] ................................ H04M 3/00
(52) U.S. Cl. ....................... 379/266.04; 379/265.02; 379/221.03
(58) Field of Search ................ 379/266.04, 265.02, 379/220.01, 265.03, 309, 221.03, 210.01

(56) References Cited

U.S. PATENT DOCUMENTS

| 4,661,974 | A |   | 4/1987  | Bales et al. ............... 379/198 |
|-----------|---|---|---------|--------------------------------------|
| 4,802,199 | A |   | 1/1989  | Lange et al. .............. 379/221  |
| 5,299,259 | A | * | 3/1994  | Otto ......................... 379/221 |
| 5,335,268 | A | * | 8/1994  | Kelly, Jr. et al. ......... 379/112  |
| 5,337,352 | A |   | 8/1994  | Kobayashi et al. ........ 379/234    |
| 5,590,188 | A | * | 12/1996 | Crockett .................... 379/225 |
| 5,910,983 | A | * | 6/1999  | Dezonno et al. .......... 379/266    |

FOREIGN PATENT DOCUMENTS

EP          0 798 942 A2    10/1997
EP          0 810 801 A2    12/1997

OTHER PUBLICATIONS

N. Shaye: "Private Interconnect Networks Overview" GTE Automatic Electric World–Wide Communications Journal, vol. 20, No. 1, 1982, ages 2–12, XP002101198.
Toit Du A.: "Private PBX Networks: Cost Effective Communication Solutions" Proceedings of the Africon Conference, Ezulwini Valley, Swaziland, Sep. 22–24, 1992, Sep. 22, 1992, pp. 637–640 XP000420285.
Torrieri D.: "Algorithms for Finding an Optical Set of Short Disjoint Paths in a Communication Network" IEEE Transactions on Communications, vol. 40, No. 11, Nov. 1, 1992, pp. 1698–1702, XP000336308.
Chia–Jiu Wang et al.: "The Use of Artificial Neural Networks for Optimal Message Routing" IEEE Network: The Magazine of Computer Communications, vol. 9, No. 2, Mar. 1, 1995, pp. 16–24, XP000493486.

* cited by examiner

*Primary Examiner*—Ahmad F. Matar
*Assistant Examiner*—Rasha Al-Aubaidi
(74) *Attorney, Agent, or Firm*—Sughrue Mion, PLLC

(57) ABSTRACT

In private telecommunication networks offering a call completion on busy link service, if a call request cannot be completed because of congestion of a link, and if setting up the call entails an overflow to the public network, the rights of the user may not be sufficient for subsequent completion of the call. To prevent this service being offered to a user whose rights are insufficient to enable subsequent call completion, because of the overflow, costs are assigned to the various links of the private network as a function of the overflows and access to the call completion on busy link service is monitored as a function of the rights of the user and the minimum total cost of completing the requested call. This prevents users with insufficient rights being queued indefinitely waiting for the call completion on busy link service.

10 Claims, 5 Drawing Sheets

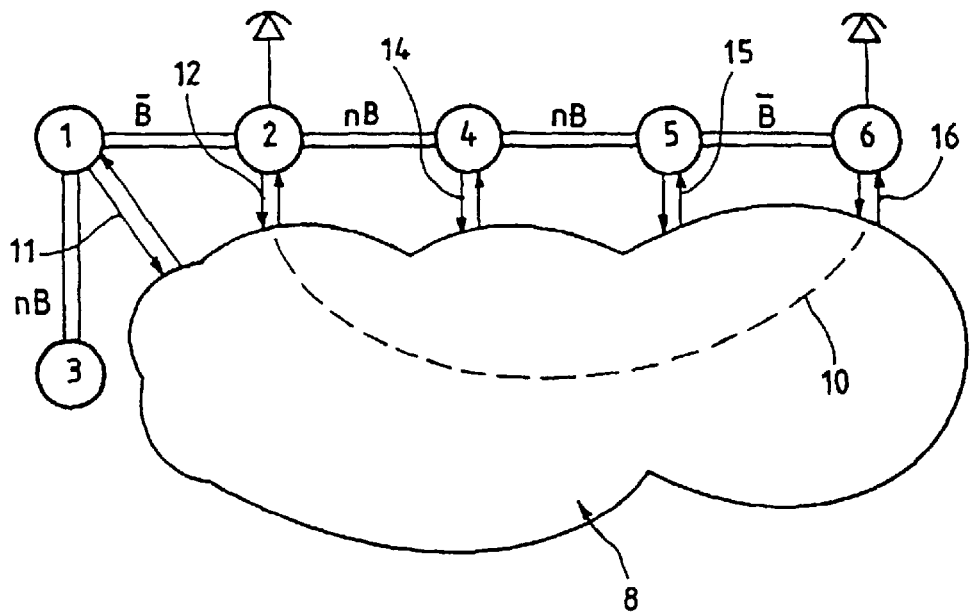
FIG_1
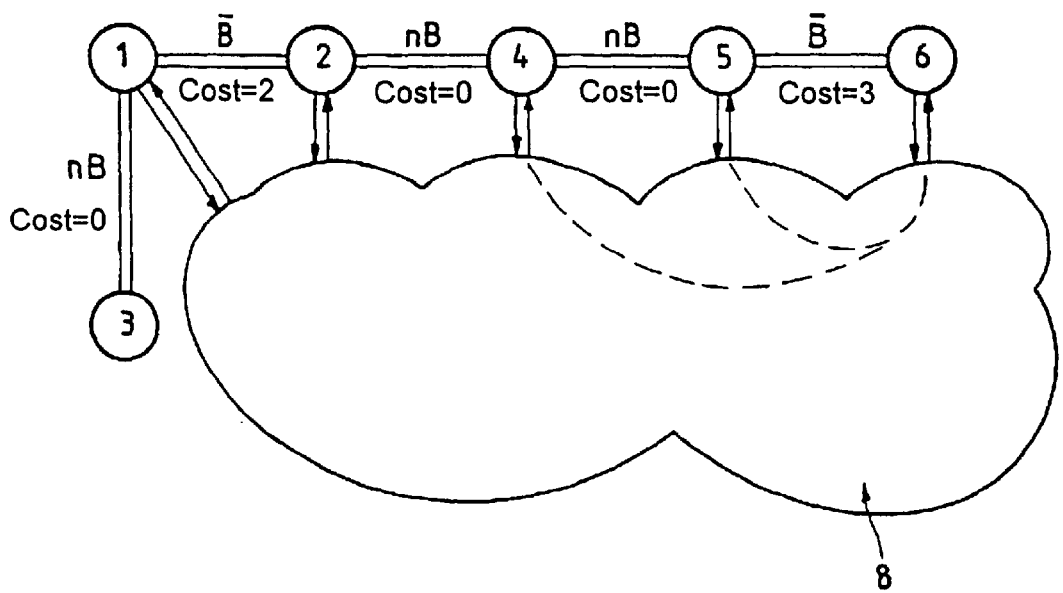
FIG_2

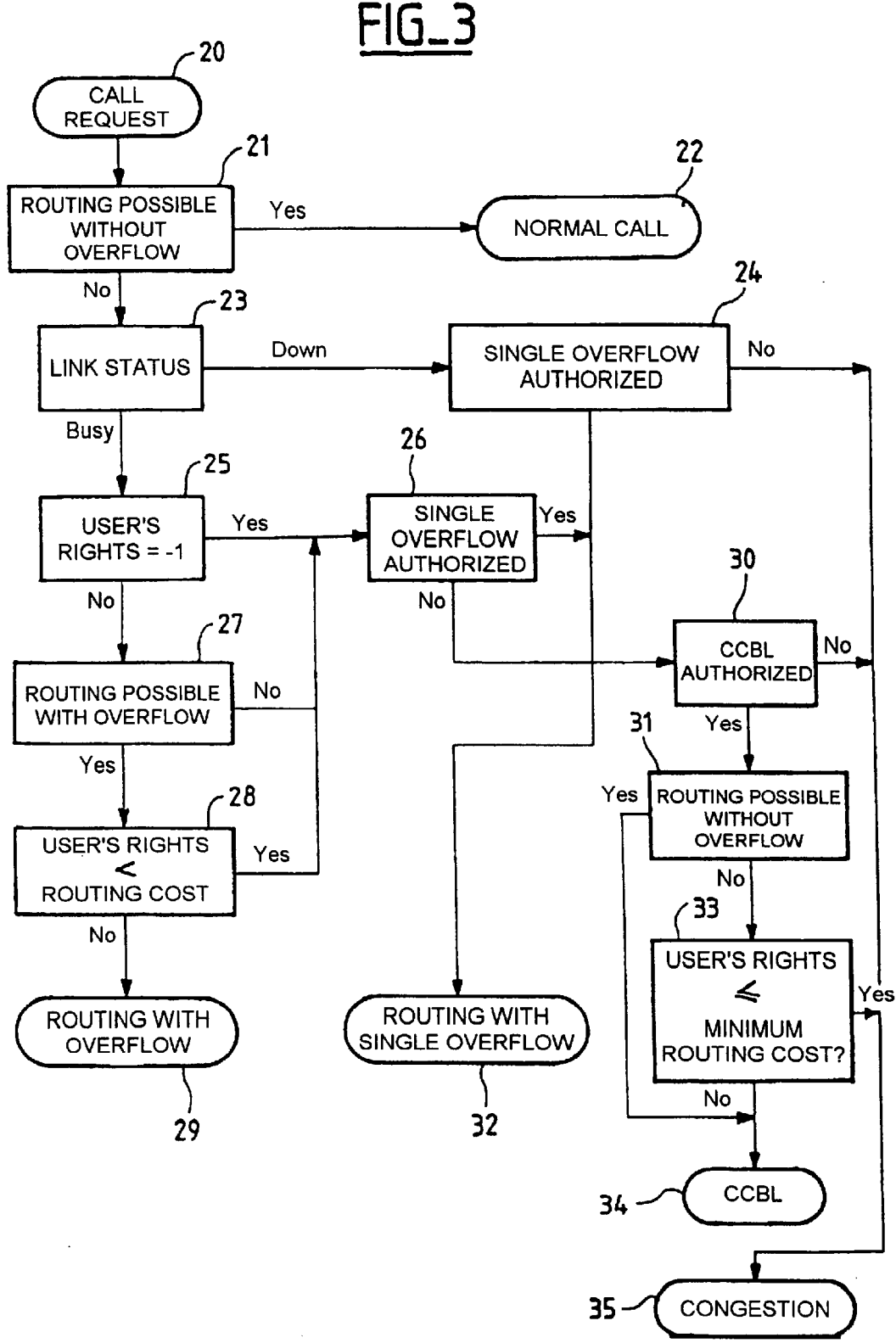

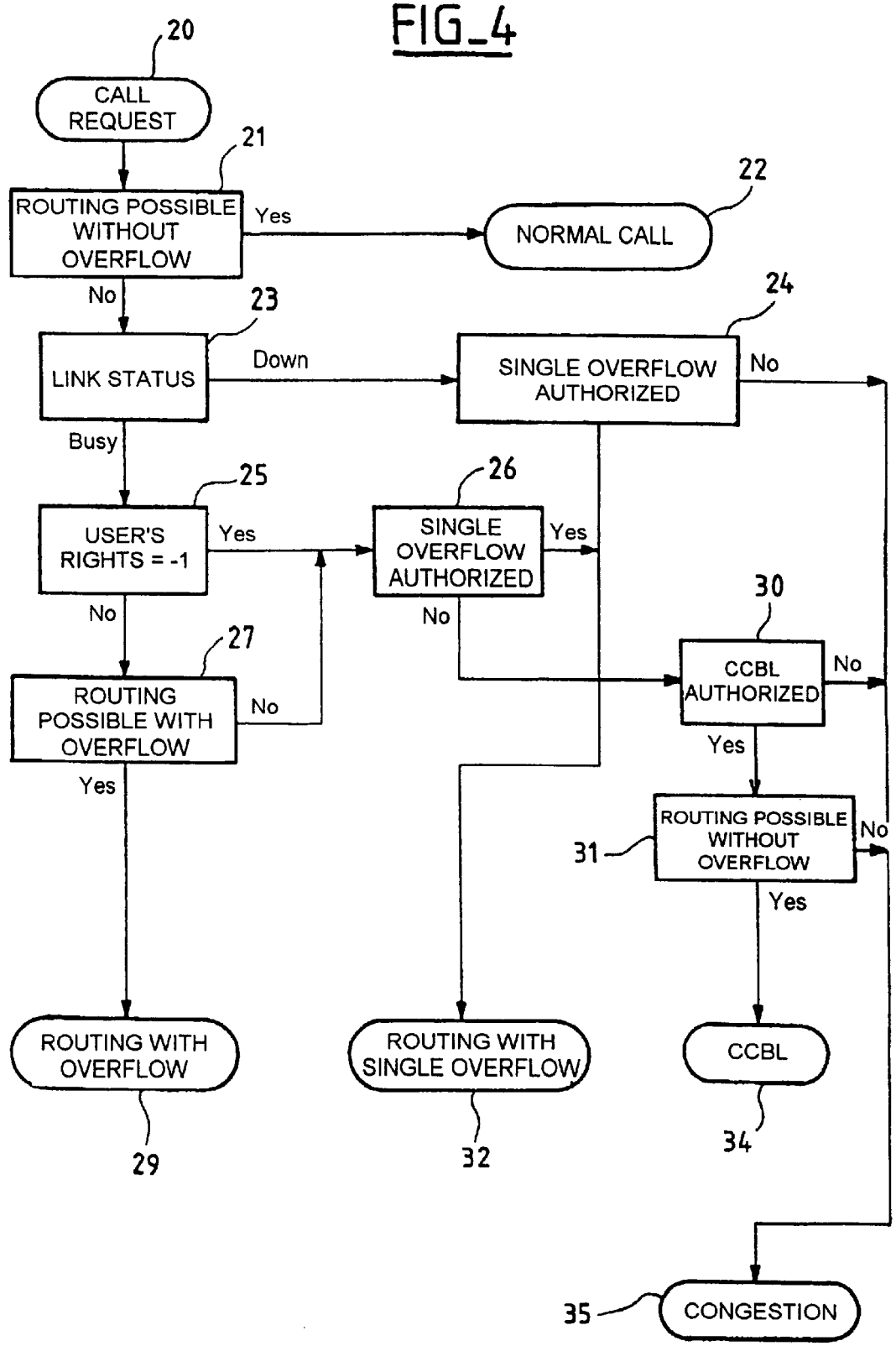

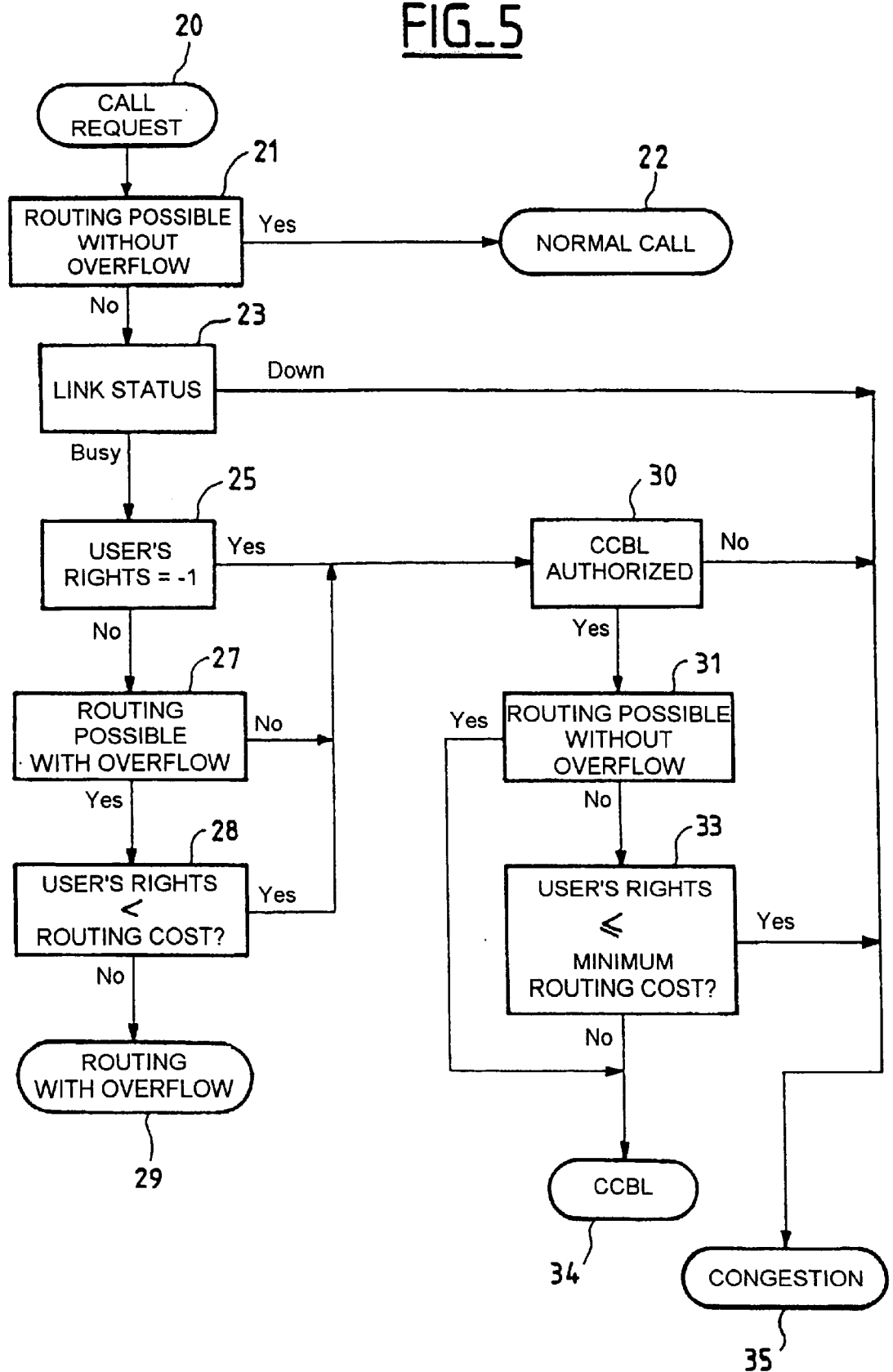
FIG_5

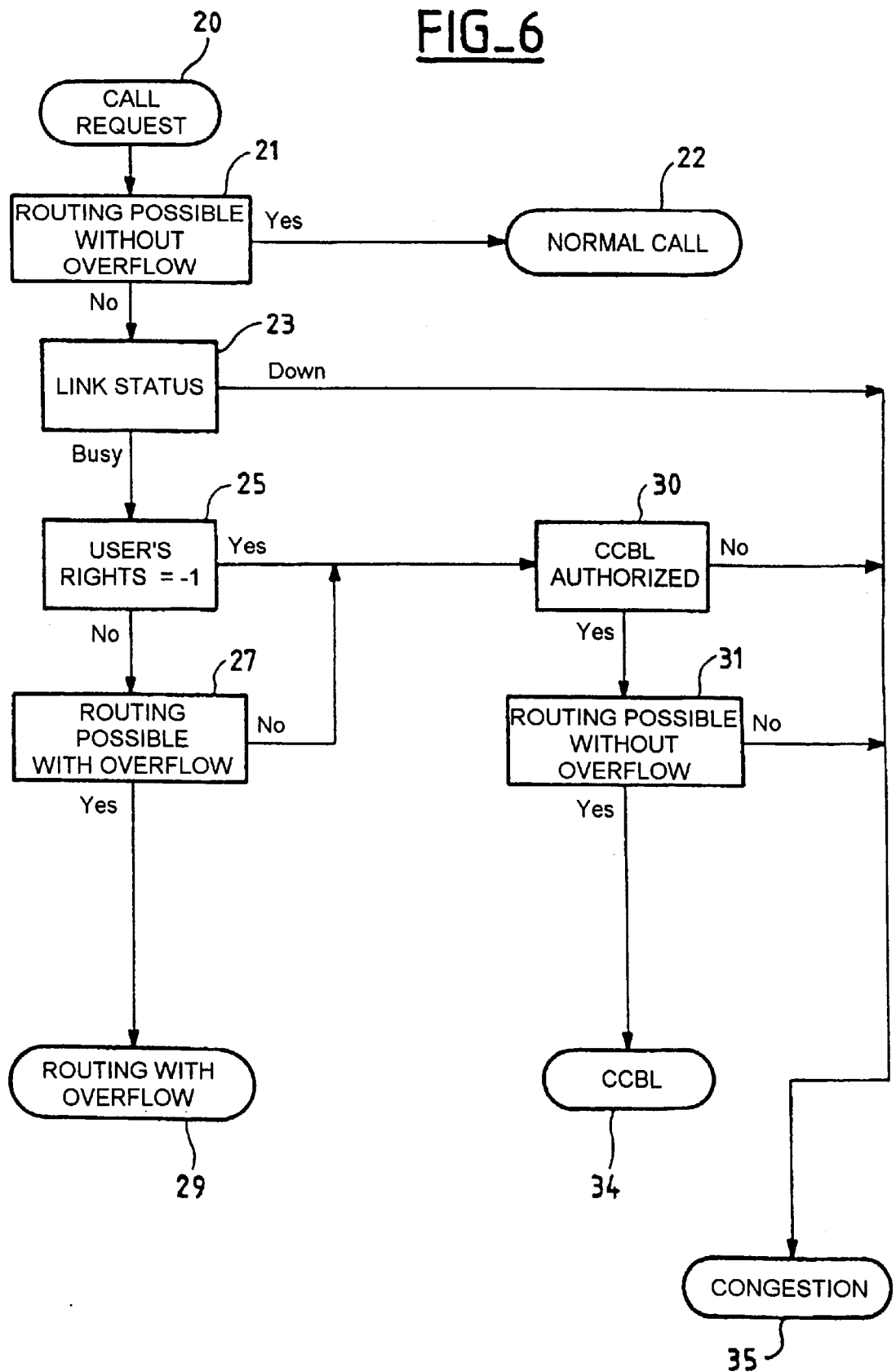
FIG_6

CONTROL OF ACCESS TO THE CALL COMPLETION ON BUSY LINK SERVICE IN A PRIVATE TELECOMMUNICATION NETWORK

BACKGROUND OF THE INVENTION

1. Field of the Invention

The present invention is a method of controlling access to the call completion on busy link service in a private telecommunication network.

2. Description of the Prior Art

The invention concerns private telecommunication networks. Such networks are formed of communication nodes connected together by links carrying calls and/or signaling. It applies equally to physical private networks (which are formed of dedicated connections), virtual private networks and hybrid networks combining the two solutions. In the remainder of the description the invention is described with reference to one example of a private network with signaling, but it applies more generally to other private networks.

The Dijkstra algorithm is described in the literature on algorithms and calculates the shortest path between tow nodes in a graph. In operation, the algorithm considers a graph G with N nodes, which is valued, i.e., each existing path of which between two nodes i and j is assigned a value or weight I(i,j); considers an outgoing node s of the graph G and an incoming node d; and seeks a path minimizing Π (s,d), the distance from s to d, i.e., the sum of the values of the connections s to d. S is the subgraph of G formed of the nodes x for which the minimum path to s is known, and $\overline{S}$ is its complement. $\Gamma_i$ is the set of nodes adjoining a given node i.

Initially the subgraph S contains only the node s, and $\overline{S}$ contains all the other nodes, assigned the following initial values:

$\pi(s, i) = l(s, i)$ for $i \in \Gamma_s$, the parent node being s;

$\pi(s, d) = \infty$, for the other nodes, which have no parent node.

An iteration of the algorithm is effected in the following manner.

If $\overline{S}$ is empty, or if it contains only nodes i with $\pi(s, i) = \infty$, the algorithm has finished.

Otherwise, the node n of $\overline{S}$ is considered which is nearest the originating node, i.e. the node which minimizes $\pi(s, i)$, $i \in \overline{S}$; this node is taken from $\overline{S}$ and placed in S.

The nodes adjacent this node n are then considered and the algorithm calculates $\pi(s, n) = l(n, j), j \in \Gamma_n$ and $j \in \overline{S}$;

If this quantity is less than $\pi(s, j)$, then $\pi(s, j)$ is updated:

$\pi(s, j) := \pi(s, n) + l(n, j)$ and the parent node of is also updated, which becomes n.

This operation is carried out for all the nodes of $\Gamma_n$, after which $\overline{S}$ is reordered.

In this way, all the nodes of the graph are progressively added to S, in order of increasing path length. To find a path to a given node d, the algorithm can be interrupted before it finishes, since the destination node a has been added to the subgraph S.

The validity of the algorithm is demonstrated by the following reductio ad absurdum argument. Consider the node n nearest $\overline{S}$ which must be added to S. If there is a nearer path, that path starts from s and arrives at n and has a first node m in $\overline{S}$. Then:

$\pi(s, m) + \pi(m, n) < \pi(s, n)$ and, since $\pi(m, n)$ is positive or zero:

$\pi(s, m) < p(s, n)$ which contradicts the hypothesis. It is also clear that $\pi(s, m)$ has been calculated in a preceding iteration, when adding the parent of m to S.

The document by J. Eldin and K. P. Lathia "Le RNIS appliqué au Centrex et au réseaux privés virtuels" [The ISDN applied to Centrex and to virtual private networks] contains a description of physical private networks and virtual private networks. As explained in the document, in a physical private network the various sites or nodes are connected by dedicated circuits but in a virtual private network each node is connected to the local switch nearest the public network, where appropriate software sets up the connections on demand. There are two variants of the virtual private network: on the one hand, semi-permanent connections can be provided, which are set up without dialing as soon as any of the nodes requires the circuit, and which always connect the same two points. Such may be the case in particular for signaling connections in an application on an integrated services digital network. On the other hand, switched connections can be provided, which can be set up only by dialing.

The remainder of the description considers only physical or virtual private networks formed of nodes connected by links, which can be of any type: dedicated connections, or links using an external network; the latter can be of any type—the public switched network, a public land mobile network, an integrated services digital network, etc. FIG. 1 shows one example of a private network of this kind. This network includes, for example, nodes 1 to 6; nodes 1, 2 and 4 to 6 are connected to the public network 8 by circuit groups 11, 12 and 14 to 16. The nodes are interconnected by links formed of private connections, shown in bold in the figure, or, as in the case of the link between nodes 5 and 6, by a link comprising only a signaling connection. For a digital link, each private connection comprises at least one access, formed by a signaling connection and a plurality of B channels. The link between nodes 5 and 6 in FIG. 1, and likewise the link between nodes 1 and 2, comprises a signaling connection and no B channel; this is typical of a node corresponding to a branch office, for which the volume of traffic is not very high.

The problem of overflow, i.e. the problem of a call request that cannot be satisfied by the network because its resources are congested, arises in private networks. This problem can arise if the private links of the private network have a fixed capacity, rather than a capacity which is allocated dynamically and which is less than the possible maximum volume of traffic. Completing the corresponding call using the public network is known in itself. In other words, if a user at node 2 wants to contact a user at node 6, and if the private network is congested and cannot complete the call, the call is completed via circuit groups 12 and 16 and the public network. This can be the case, for example, if the connection between nodes 2 and 4 is congested. In FIG. 1, reference numeral 10 shows schematically a call of this kind via the public network. Overflow may also be necessary if the link in question has no B channel, as in the case of node 6 in FIG. 1.

One problem is the cost of such overflows. Because of this cost, rules can be defined denying certain users or certain categories of user access to this service.

The prior art also provides a CCBL (call completion on busy link) service which provides automatic callback if a link of the private network is busy or congested. In this case, the calling user is put on hold for as long as the private network link is congested and is called back when sufficient resources are released to route the call. In existing private networks this CCBL service is provided without distinguishing between users.

This solution gives rise to the following problem in the case of overflows to the public network. If an overflow is necessary to reach the called user, and if the rights or monitored cost of the user are less than the charge incurred for the overflow, the CCBL service might never call back. This is the case in particular for users who have no overflow rights. The CCBL request therefore remains unsatisfied.

The invention proposes a solution to this new problem. It prevents users being queued unnecessarily and prevents congestion of the private network by CCBL requests that cannot be satisfied. The invention applies particularly to the routing solution proposed in our application filed the same day as this application with the title "Routing of calls with overflow in a private network". It also applies to routes chosen by a separate process and which enables one or more overflows to a public network.

SUMMARY OF THE INVENTION

To this end, the invention proposes a method of controlling access to the call completion on busy link service in a private telecommunication network allowing overflow to another network, wherein users are allocated rights to overflows and access to the service by a user for a call entailing at least one overflow is dependent on the rights of the user.

In one embodiment of the method some users do not have the right to overflows and access to the service for a call entailing at least one overflow is refused to such users.

A step of calculating the minimum number of overflows for a call can be provided, advantageously using the Dijkstra algorithm.

In one embodiment of the method certain links are not monitored, certain users do not have rights to overflows except on said links which are not monitored and access to the service for a call entailing at least one overflow onto an unmonitored link is refused to such users.

A step of calculating the minimum number of overflows onto monitored links for a call can be provided, advantageously using the Dijkstra algorithm.

In another embodiment of the invention access to the service by a user for a call entailing at least one overflow depends on a comparison of the rights of the user and the cost of the overflow(s).

The method preferably comprises a step of calculating the minimum cost of the overflows for a call, preferably using the Dijkstra algorithm.

A connectivity flag can then be propagated during application of the Dijkstra algorithm to determine if there is a path without overflows.

Other features and advantages of the invention will become apparent on reading the following description of embodiments of the invention, which is given by way of example and with reference to the accompanying drawings.

BRIEF DESCRIPTION OF THE DRAWINGS

FIG. 1 is a diagrammatic representation of a prior art private network.

FIG. 2 is a diagrammatic representation of a private network in which the invention is used.

FIGS. 3 to 6 are flowcharts of various embodiments of the invention.

DETAILED DESCRIPTION OF THE PREFERRED EMBODIMENTS

The invention proposes, in a virtual private network, to determine the minimum cost of a call, in terms of overflows, to enable efficient management of the CCBL service as a function of the rights of calling users.

To this end, the invention proposes to assign to each link of the private network a valuation or cost, denoted CCBLCost hereinafter, reflecting the fact that an overflow is necessary or not necessary to route a call between the two nodes connected by that link. FIG. 2 is a diagrammatic representation of a private network, similar to that from FIG. 1; FIG. 2 show the number of channels on each link, and the corresponding CCBLCost. The latter can be determined in the following manner:

for links allowing routing of calls, the cost is zero;

for links necessarily involving an overflow, the cost is non-zero.

Accordingly, in the FIG. 2 embodiment, the CCBLCost is zero for the links between nodes 1 and 3, 2 and 4, 4 and 5. In fact, each of these links has at least one B channel and therefore can route calls without overflow onto the public network.

The CCBLCost of the links between nodes 1 and 2, on the one hand, and between nodes 5 and 6, on the other hand, is non-zero. In fact, these links have no B channel, but only a signaling channel, and overflow is therefore essential for routing a call.

The invention therefore makes it easy to determine whether overflow is needed or not for a call request and to grant or refuse the CCBL service. For this it is sufficient, for a given call request, to sum the CCBLCost values of the links that the requested call must use; the minimum cost of the call is obtained in this way.

For example, between nodes 2 and 5, a call can be set up via node 4 and links of the private network which each have at least one B channel. The cumulative CCBL cost of the various links is therefore zero, and this is representative of the fact that a call can be set up without overflow.

Between nodes 4 and 6, for example, or between nodes 2 and 6, a call can be set up only using overflow via the public network. The overflow can be direct overflow, as in the prior art, using a call via the public network between nodes 4 and 6, for example. As explained in our patent application referred to above, the overflow can also be an overflow between nodes 5 and 6, the call passing between nodes 4 and 5 in the private network.

In all cases, a call between these nodes necessarily uses a link of the private network whose CCBLCost is non-zero. This is representative of the fact that a call cannot be set up without at least one overflow.

In this embodiment, the valuation or the cost of the links having only a signaling channel can have any non-zero value; a value of 1 is suitable, for example. The invention enables the CCBL service to be refused to a user who has no overflow rights if the call envisaged necessarily entails an overflow. In this case the invention functions in the following manner. In the case of a call set-up request, if a link is busy, and if the CCBL service is required, the algorithm determines:

if the user has the overflow right, and if there is a possible route without overflow.

If the user has no overflow right, and if there is no possible route for the requested call, the CCBL service is refused. This avoids queuing users unnecessarily.

To determine whether a call for which the CCBL service is required entails an overflow or not, the invention proposes to calculate the shortest path across the private network, treating the CCBLCost as defined above as a distance. It is therefore possible to determine the minimum cost in terms of overflows for a given call, in order to refuse or to grant the CCBL service. In other words, with the valuation choices defined above, a shortest path calculation is effected:

if the shortest path has a zero total valuation, there is a route without overflow;

if the shortest path has a non-zero total valuation, there is no route without overflow.

The shortest path calculation can advantageously be effected using the Dijkstra algorithm. The algorithm can be applied to the invention by considering the graph formed of the nodes of the private network, the links between the nodes being valued by the CCBLCost defined above. The minimum path for a call, in terms of the cumulative CCBLCost on the links of the private network, is obtained in this way in a time period $O(n2)$.

Other methods could also be used to determine if there is a route without overflow; as in the second embodiment, one solution consists in propagating a flag representative of the connectivity between the current node and the originating node when applying the Dijkstra algorithm.

The invention applies in this first embodiment, and refuses the CCBL service to users who have no overflow rights. Referring to FIG. 2, for example, a user at node 1 may want to call a user at node 4. The shortest path in the private network, in terms of the CCBLCost valuation, is a non-zero distance: in fact, because node 1 is connected to the part of the private network containing node 4 only via the link between the nodes 1 and 2, which has no B channel, a call to a user at node 4 entails an overflow, at least onto the link between nodes 1 and 2. In this case, as explained above, if a user has no right to an overflow, a CCBL request granted to that user might never be satisfied. In this situation the invention proposes to refuse the CCBL service to the user.

Another embodiment of the invention will now be described; in this embodiment, the invention proposes to grant the CCBL service or not as a function of the rights of the user and the cost of the overflows needed to route the call. This embodiment of the invention allocates users rights that can take more than two values, i.e. that are no longer binary.

In this embodiment, the valuation or the cost of the links having only a signaling channel has a non-zero value which is made equal to the overflow cost. In this way not only can the CCBL service be refused to users who do not have overflow rights, but also the CCBL service can be provided or not to users having given rights, as a function of the cost of the call for which the CCBL service is requested. In FIG. 2, the CCBLCost between nodes 1 and 2 is 2, which reflects the cost of the overflow between these nodes; the overflow can be via circuit groups 11 and 12; the CCBLCost between nodes 5 and 6 is 3, for an overflow via circuit groups 15 and 16. This example considers the minimum cost that corresponds to overflow via the nearest circuit groups. Depending on the nature of the public network and the circuit groups, the minimum cost can correspond to these overflows via circuit groups other than the nearest circuit groups.

In this embodiment, it is also possible to allocate a zero valuation to a link for which an overflow is mandatory. In this way a zero valuation can be allocated to a link having no transmission paths, which amounts to authorizing overflow to that link independently of the rights of users. This corresponds to a choice of the network administrator whether or not to monitor overflows onto a given link.

This second embodiment of the invention compares the rights of a user with the cumulative cost of the overflows. In this case, each user is allocated rights or monitored costs representative of the maximum charge that can be incurred for overflows. At the time of a request, the CCBL service is granted or refused according to the result of comparing these rights to the minimum cost of the call for which the CCBL service is required. In a configuration of this kind, the rights of a user can be defined in the following manner:

−1 if the user has no right to overflow to the public network;

0 if the user has a right to overflow only if the links cannot route calls, i.e. if the links do not have any B channels, in this example;

n, 1=n=max if the user has a right to overflow(s) to the public network, to the extent that the cumulative charges are less than or equal to n, "max" being a higher value for which there are no limits on the rights of the user.

In this example of definition of the rights of users, for a user with "−1" rights the situation is as described above with reference to the first embodiment. A user of this kind cannot obtain a CCBL service entailing overflows; this can be the case for long calls, for example data transfers. This definition of rights with a value "−1" is used to distinguish users for whom an overflow is never possible, even for links without transmission paths having a zero valuation.

A user with "0" rights can obtain a CCBL service on a routing without overflow or on a routing with overflows onto links that are not monitored, i.e. onto links with no transmission paths whose valuation is zero.

A user with rights n, 1=n=max can obtain the CCBL service for a call involving overflows with a total cost less than n.

The Dijkstra algorithm can again be used in this embodiment of the invention to determine the minimum cost of a route, in order to grant the CCBL service or not. At the same time it is possible to determine if there is a route without overflow by propagating a flag representative of the connectivity with the source node via the B channels. Then, during iterations of the Dijkstra algorithm, it is possible to use a flag BchConn(i) representative of the connectivity of the node i with the originating node via links with B channels. This provides a simple way of determining if there is a route without overflows.

BchConn(i) is initialized to the value "false" for all i different from s. With the same notation as above, consider n a node and $\Gamma_n$ its vicinity, the node n being at a given time the summit of the subgraph $\overline{S}$. For any node v in the vicinity, the algorithm determines whether there is a B channel between the node n and the node v. If there is such a channel—which can be declared on initializing the network—the flag BchConn(v) is updated to the value "true" if the flag BchConn(n) is true. In other words, if the node v is connected to the node s by B channels, and if the link between n and v also includes a B channel, the node b is connected to the node s by n channels.

If the node n is not connected to the node s, or if there is no B channel between the node n and the node v, the flag of the node v is left at its current value. When the Dijkstra algorithm calculates a shorter path, this solution determines the existence of a route without overflows; if there are none, this avoids queuing users having "−1" rights unnecessarily.

A CCBLCost defined as follows can be used to value the links. If the link between the node n and the node v has at least one B channel, the CCBLCost of the link is considered to be zero. If there is no B channel between the node n and the node v, the algorithm verifies if there is an overflow. If so, the algorithm determines if the link between n and v is monitored. If not, the CCBLCost is zero. In contrast, if the link is monitored, then the CCBLCost is equal to the overflow cost. On the other hand, if there is no overflow, the CCBLCost of the link is infinite. Thus a CCBLCost is defined with the following values:

- 0 for links having a B channel, or for links that are not monitored;
- the cost of the overflow for monitored links without B channels;
- infinity for links with no B channels for which overflow is not possible.

Choosing this cost function enables the overflow cost to be monitored as a function of the rights of the user. Furthermore, the propagation in the algorithm of a flag representative of the connectivity with the source via B channels means that the service can be refused to users who have no right to overflow.

FIG. 3 is a flowchart of one embodiment of the invention for one such type of definition of user rights; the FIG. 3 embodiment considers not only overflows of the type described above, but also single overflows to the public network. In the former case, referred to also hereinafter as overflows to a "virtual private network", the overflow is transparent for the private network user; the signaling is routed via the private network and the overflow compensates for the absence or congestion of B channels. In the latter case, the overflow amounts to supplying the user with only the services of the public network, the services specific to the private network being lost.

Step 20 corresponds to a call set-up request by a given user of the private network. In step 21, the algorithm determines if the call can be routed in the private network without overflow. If it can, the algorithm moves on to step 22 and the connection is set up via the private network without overflows. If not, the algorithm moves on to step 23.

In step 23, routing without overflow is impossible; the status of the link(s) for which an overflow is necessary is determined; if a link is down, the algorithm moves on to step 24, otherwise it moves on to step 25. This step is not mandatory, but it has the advantage of enabling different treatment of calls when a portion of the private network is down.

In step 24, a link is known to be down. In this case no connection providing the services of the private network can be provided. The algorithm determines if a single overflow is authorized in this case of a link being down. This in fact represents a parameter setting of the private network by the operator. If it is not authorized, there is congestion, the algorithm moves on to step 25, and the CCBL service is refused.

If it is authorized, on the other hand, the algorithm moves on to step 32. In step 32 the call is routed with a single overflow, i.e. providing only the services of the public network.

In step 25, it is known that the overflow is imposed by congestion of the channels of at least one link; the rights of the calling user are determined. If the rights of the user are "−1", i.e. if the user never has the right to an overflow, the algorithm moves on to step 26. Otherwise it moves on to step 27.

Step 27 determines whether the call can be routed with one or more overflows; if so, the algorithm moves on to step 28 and if not to step 26.

Step 28 compares the routing cost with overflow to the rights of the user. If the rights of the user are less than the cost of routing the call, the algorithm moves on to step 26; otherwise it moves on to step 29.

In step 29 the call is routed with one or more overflows to the public network (virtual private network). In this case, it is not necessary to provide any CCBL service. As explained above, the services of the network are supplied and the overflow(s) are transparent for the user.

In step 26, the situation is that one of the links for setting up the connection is congested and an overflow preserving the services of the private network has not been allowed because of the limitation on the rights of the user. The algorithm determines if the user has the right to a single overflow in the case of a busy link. If so, the algorithm moves on to step 32 in which the call is routed with a single overflow (see above).

If not, the algorithm moves on to step 30. It determines if the user has a right to the CCBL service. If so, it moves on to step 31; if not, it moves on to step 35. In step 35 there is congestion (see above).

Step 31 determines if there is a possible route across the private network using only the links of the private network. This can simply be done by the shortest path calculation mentioned with regard to the first embodiment, with a non-zero valuation for all the links with no transmission paths. This can also be effected by propagating a flag in the shortest path calculation using the Dijkstra algorithm.

If this is the case, the algorithm moves on to step 34 in which the CCBL service is provided.

If not, it moves on to step 33. In step 33 it determines if the rights of the user are less than or equal to the total cost of the minimum routing, i.e. to the lowest CCBLCost for the requested connection. Once again, this comparison is advantageously effected using the Dijkstra algorithm (see above).

If the rights of the user are less than or equal to the total cost of the minimum routing, the algorithm moves on to step 35. There is congestion.

If the rights of the user are greater than the total cost of the minimum routing the algorithm moves on to step 34, in which the CCBL service is provided.

In this way, the CCBL service is always refused if the user does not have sufficient rights, which prevents the user from being queued indefinitely. Accordingly, assuming that the links are in service (no link down in step 23):

- a user having no overflow rights preserving the services of the network or single overflow rights is provided with the CCBL service only if there is a possible route across the private network (steps 25, 26, 30, 31 and 34);
- a user having rights to overflow preserving the services of the network is provided with the CCBL service only if there is a possible route across the private network whose cost is compatible, and less than the user's rights (steps 25, 26, 30, 31, 33 and 34).

Note that the FIG. 3 flowchart is compatible with the various modes of valuation of the overflows mentioned above. A zero CCBLCost can be given to a link with no B channels, or not, without this modifying the process described with reference to FIG. 3.

FIG. 4 is a flowchart of another embodiment of the invention; the FIG. 4 flowchart is suited to the first embodiment mentioned above, where it was simply a question of refusing the CCBL service if the user has no right to it. The FIG. 4 flowchart is similar to that from FIG. 3, subject to the following modifications:

- step 28 is eliminated, and so where appropriate the algorithm goes directly from step 27 to step 29;
- step 33 is eliminated, and so the algorithm goes directly from step 31 to step 35 if there is no possible route within the private network.

The FIG. 4 embodiment merely:

refuses the CCBL service for certain categories of user having no right to overflow if there is no possible route in the private network;

grants the CCBL service otherwise, independently of the cost of the overflow.

FIGS. 5 and 6 are flowcharts of further embodiments of the invention; these figures correspond to situations in which single overflow is not provided.

The FIG. 5 flowchart is similar to that from FIG. 3, subject to the following modifications:

step 24 is eliminated, and so where applicable the algorithm goes directly from step 23 to step 35;

step 26 is eliminated, and so the algorithm goes directly from step 25, 27 or 28 to step 30.

The FIG. 6 flowchart is similar to that from FIG. 4, subject to the following modifications:

step 24 is eliminated, and so where applicable the algorithm goes directly from step 23 to step 35;

step 26 is eliminated, and so the algorithm goes directly from step 25 or 27 to step 30.

Operation in accordance with the FIGS. 5 and 6 flowcharts is respectively similar to that in accordance with the FIGS. 3 and 4 flowcharts, except that no single overflow is provided.

All embodiments of the invention can manage the CCBL service in such a way as to avoid indefinitely queuing a user whose rights are not sufficient to enable subsequent routing of the call.

Of course, the present invention is not limited to the embodiments and examples described and shown, but is open to many variants that will suggest themselves to the skilled person. It applies to private network types other than those described above. It also applies to other types of overflow than those described in our aforementioned application entitled "Routing of calls with overflow in a private network". The terms "overflow", "private" and "public" have been used in the above description; the invention applies equally to overflow to different public networks, such as the public switched network, public land mobile networks or public satellite mobile networks and/or overflows to other private networks.

In the second embodiment described above, it is possible not to define users with "−1" rights; in this case, compared to the description of FIG. 3, no distinction is drawn between:

a link with a zero valuation, because it has transmission channels;

a link with a zero valuation although it does not have transmission channels, i.e. a link that is not monitored.

What is more, allocating a CCBL cost to the links of the private network can also be used for other applications.

Finally, the description and the claims mention the Dijkstra algorithm. It is to be understood that this term covers not only the version of the shortest path algorithm proposed by Dijkstra, but also similar versions, and in particular the Bellman algorithm or the Floyd algorithm. Note that the Bellman algorithm applies only to graphs without circuits.

There is claimed:

1. A method of controlling access to call completion on busy link (CCBL) service in a private telecommunication network allowing overflow to another network, wherein if a link of the private network necessary for routing a call is congested, said CCBL service providing automatic callback when sufficient resources are available to route said call, the method comprising the steps:

assigning to each link connecting two nodes of the private telecommunication network a valuation indicating whether an overflow is necessary to route a call between the two nodes;

allocating to users of said private telecommunications network rights to overflows; determining a total valuation of links required for routing a call by a user; and determining whether to provide access to said CCBL service to said user for said call based on a comparison between said rights to overflows of said user and the total valuation for routing said call.

2. The method claimed in claim 1, wherein said step of determining whether to provide access to said CCBL service includes refusing access to said CCBL service where said right to overflows of said user do not allow for overflows and said total valuation indicates that said call requires at least one overflow.

3. The method claimed in claim 2, wherein said step of determining the total valuation of links required for routing the call includes calculating the minimum number of overflows for a call.

4. The method claimed in claim 3, wherein said step of determining the total valuation of links required for routing the call uses a Dijkstra algorithm.

5. The method claimed in claim 1, wherein said step of determining whether to provide access to said CCBL service includes refusing said CCBL service when said total valuation indicates that said call requires at least one overflow onto an unmonitored link to which said user does not have rights to overflows.

6. The method claimed in claim 5, wherein said step of determining the total valuation of links required for routing the call includes calculating the total valuation of links entailing the minimum number of overflows for the call.

7. The method claimed in claim 6, wherein said step of determining the total valuation of links required for routing the call uses a Dijkstra algorithm.

8. The method claimed in claim 1, wherein said step of determining the total valuation of links required for routing the call includes calculating the total valuation of links for routing the call which result in a minimum total valuation.

9. The method claimed in claim 8, wherein said step of determining the total valuation of links required for routing the call utilizes a Dijkstra algorithm.

10. The method claimed in claim 9, wherein a connectivity flag is propagated during application of the Dijkstra algorithm to determine if there is a path without overflows.

* * * * *